United States Patent [19]

Carter et al.

[11] Patent Number: 4,508,101
[45] Date of Patent: Apr. 2, 1985

[54] THERMAL ENERGY STORAGE SYSTEM

[75] Inventors: Don E. Carter; Henry K. Yuen, both of Creve Coeur, Mo.

[73] Assignee: Monsanto Company, St. Louis, Mo.

[21] Appl. No.: 366,794

[22] Filed: Apr. 9, 1982

[51] Int. Cl.$^3$ ............................................. F24J 3/02
[52] U.S. Cl. ..................................... 126/436; 252/70; 126/400
[58] Field of Search ................. 252/70; 126/400, 438, 126/430, 436

[56] References Cited

U.S. PATENT DOCUMENTS

| | | | |
|---|---|---|---|
| 2,244,612 | 6/1941 | Growley | 252/70 X |
| 2,846,421 | 8/1958 | Pollack | 260/823 |
| 3,480,414 | 11/1969 | Mehmedbusich et al. | 252/70 X |
| 3,913,559 | 10/1975 | Dandliker | 126/400 |
| 4,063,546 | 12/1977 | Schmid et al. | 126/271 |
| 4,131,158 | 12/1978 | Abhat et al. | 126/400 X |
| 4,182,398 | 1/1980 | Salyer et al. | 165/1 |
| 4,192,144 | 3/1980 | Pierce | 126/400 X |
| 4,258,696 | 3/1981 | Gopal | 126/400 |
| 4,259,198 | 3/1981 | Kreibich et al. | 126/400 X |
| 4,259,401 | 3/1981 | Chahroudi et al. | 126/430 X |
| 4,290,416 | 9/1981 | Maloney | 126/400 X |
| 4,304,219 | 12/1981 | Currie | 126/430 X |
| 4,326,975 | 4/1982 | Cadet | 126/400 X |

FOREIGN PATENT DOCUMENTS 601553  4/1978  U.S.S.R. ............. 126/400

OTHER PUBLICATIONS

D. Eissenberg et al., "What's in Store for Phase Change?", *Solar Age*, 12–16, May, 1980.
C. J. Swet, "Phase Change Storage in Passive Solar Architecture", *Proceedings of the American Section of the International Solar Energy Society*, vol. 5.1, 282–286, Oct., 1980.
D. H. Kaelble et al., "Crystalline Polymers as Heat Storage Materials in Passive Thermal Protection Systems", *Polymer Eng. and Science* 15 (9), 673–678, Sep., 1975.
D. A. Sama et al., "Phase Change Fluids for Solar Thermal Systems", *Proceedings of the 80th National Meeting of the AIChE*, Nov., 1980.

*Primary Examiner*—Larry Jones
*Assistant Examiner*—Carl D. Price
*Attorney, Agent, or Firm*—Dennis R. Hoerner, Jr.; Joseph D. Kennedy; James W. Williams, Jr.

[57] ABSTRACT

A thermal energy storage system for absorption of heat from a heat source having a temperature above a predetermined temperature and release of heat to a heat sink having a temperature below the predetermined temperature. The system comprises a heat storage mass comprising a condensed state material which changes between the solid and liquid phases at about the predetermined temperature and a compartment for containing the heat storage mass. The compartment includes means providing an area for transfer of heat between a fluid and the material. The material may be an aliphatic diamine corresponding to the general formula $$H_2N-(CH_2)_n-NH_2$$

where n is an integer between 4 and 14 inclusive, bis(-hexamethylene)triamine, 3-aminobutylcyclohexylamine or p-phenylenediamine. Mixtures of these amines with each other may be used, particularly including certain eutectic mixtures having melting points near room temperature. Also useful are mixtures containing at least one of said amines and water or another agent for lowering the melting point of the amine.

41 Claims, 11 Drawing Figures

THERMAL ENERGY STORAGE SYSTEM

BACKGROUND OF THE INVENTION

This invention relates to the field of thermal energy storage systems and more particularly to a novel system for absorption and release of heat utilizing a condensed state phase change material.

Among the practical problems involved in solar energy systems is the need for an effective means by which the heat collected during periods of bright sunshine can be stored, preserved and later released for utilization during the night or other periods when the sun is not shining. Traditionally, energy collected during periods of sunshine has been stored in the form of sensible heat, typically by raising the temperature of rocks, water, oil, salt solutions, etc. Subsequent passage of a heat transfer fluid over the hot energy storage system releases the heat which then can be used to heat water, to provide residential heating, or for other uses.

In passive systems, an energy storage system serves as a buffer, absorbing energy from its environment when the surroundings are in the high temperature portion of a regular temperature cycle (as in daytime) and releasing energy to the surroundings during the low temperature portion of the cycle (as at night).

Storage of the thermal energy in the form of sensible heat creates practical problems in the design and operation of a solar heating or passive buffer system. Thus, to provide for storage of adequate quantities of heat energy in a solar system, it is necessary to either raise the thermal energy storage material to a high temperature or to utilize a large mass of heat storage material. Where high temperatures are used, solar collectors must operate at correspondingly high temperatures, which inhibits their efficiency and increases their complexity. The alternative of using a large mass of heat storage material necessitates a large space allocation and may also involve relatively expensive heat transfer apparatus.

In a passive system, the buffering capacity of a sensible heat storage material is generally very limited.

Thus, a need has existed for an improved thermal energy storage system which is relatively compact, has high buffering capacity for passive use, and can be operated at moderate temperature for collection and release of heat derived from solar energy or collected from other heat sources.

Among other heat sources of potential economic importance are industrial process streams which carry waste heat at relatively modest temperature. Such streams may not be hot enough for use in steam generation and, depending on the nature of the industrial process, there may be no practical opportunity to recover the heat in other conventional ways such as pre-heating of feed streams. With the rapid escalation of energy costs, a need has existed for improved techniques for the recovery of low temperature waste process heat.

SUMMARY OF THE INVENTION

Among the several objects of the present invention, therefore, may be noted that provision of an improved system and process for the storage of thermal energy; the provision of such a system and process which may be operated to absorb heat from an energy source and release the absorbed heat to a heat sink such as a hot water or residential heating system or for utility services in an industrial process plant; the provision of such a system and method by which relatively substantial amounts of heat can be stored in a heat storage material of modest weight and compact dimensions; the provision of such a system and method which allow absorption and storage of thermal energy at modest temperatures; the provision of such a system and method which afford efficient rates of heat transfer to and from the heat storage material; the provision of such a system and method which utilize inexpensive and relatively non-toxic heat storage material; the provision of such a system which has a high buffering capacity for use in passive heat absorption and release applications; and the provision of such a system and method which can be effectively utilized in a solar energy system or in the recovery of low temperature process waste heat.

Briefly, therefore, the present invention is directed to a thermal energy storage system for absorption of heat from a heat source having a temperature above a predetermined temperature and release of heat to a heat sink having a temperature below that predetermined temperature. The system comprises a heat storage mass comprising a condensed state material which changes between the solid and liquid phases at about the predetermined temperature and a compartment for containing the heat storage mass. The compartment includes means providing an area for transfer of heat between a fluid and the material. The phase change material may be an aliphatic diamine having the general formula

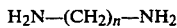

$$H_2N-(CH_2)_n-NH_2$$

where n is an integer between 4 and 14 inclusive, bis(hexamethylene)triamine, 3-aminobutylcyclohexylamine or p-phenylenediamine. Mixtures of these amines with each other may also be used, as may mixtures of at least one of said amines with water or with another agent for lowering the melting point of the amine.

The invention is further directed to a solar heat collection system comprising a solar thermal energy collector having means for transfer of solar energy to a heat transfer fluid and heat storage means comprising a heat exchanger having a passage for flow of heat transfer fluid therethrough and a compartment containing a heat storage mass comprising a condensed state material of the type recited above which changes between the liquid and solid phases at a temperature below a temperature to which the heat transfer fluid may be raised by the solar collector. Heat from the fluid heated by the collector is transferred to the material through a wall of the compartment which divides it from the fluid passage. The collection system further comprises means for transporting fluid heated by the solar collector to an outside surface of the compartment wall for transfer of heat to the phase change material for melting thereof and means for transporting a heat transfer fluid at a temperature below the freezing point of the phase change material to an outside surface of a wall of the compartment for absorption of heat from the material and freezing thereof. There is heat delivery means for transferring heat to a heat sink from a fluid heated by absorption of heat from the phase change material.

The invention is also directed to a method for absorbing heat from a source thereof and releasing heat to a heat sink. In accordance with this method, heat is transferred from a heat source to a heat storage mass comprising a material having a melting point below the temperature of the source, thereby causing the material to absorb energy by melting. Heat is transferred from the molten material to a heat sink having a temperature below the freezing point thereof, thus causing the material to release energy by freezing. In this instance also, the phase change material comprises an aliphatic diamine having the general formula $$H_2N-(CH_2)_n-NH_2$$

where n is an integer between 4 and 14 inclusive, bis(hexamethylene)triamine, 3-aminobutylcyclohexylamine, p-phenylenediamine, mixtures thereof with each other, mixtures containing at least one of the amines and water, and mixtures containing at least one of said amines and another agent for lowering the melting point thereof.

The invention is further directed to a composition adapted for use in active or passive thermal energy storage systems. The composition comprises a eutectic mixture of bis(hexamethylene)triamine and hexamethylene diamine.

Further included in the invention is a composition adapted for use in active or passive thermal energy storage systems and comprised of a phase change material and a nucleating agent therefor. The phase change material may be any of those useful in the systems and method of the invention.

Other objects and features will be in part apparent and in part pointed out hereinafter.

BRIEF DESCRIPTION OF THE DRAWINGS

Corresponding reference characters indicate corresponding parts in the several views of the drawings.

DESCRIPTION OF THE PREFERRED EMBODIMENTS

Figure 1:
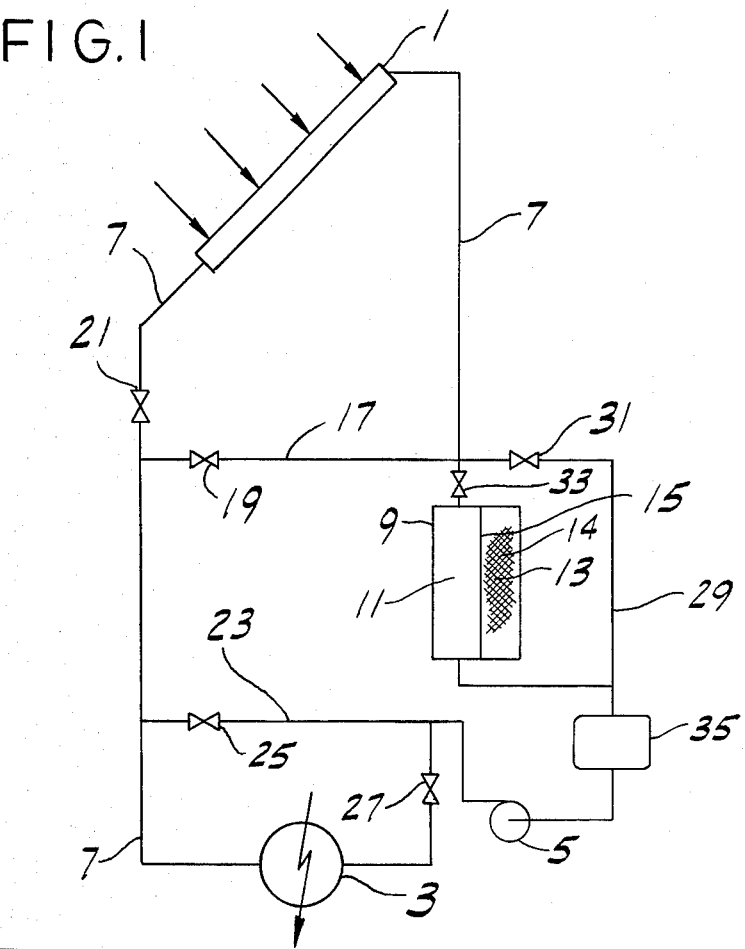
FIG. 1 is a schematic flow diagram illustrating a system of the invention used for storage of thermal energy in a solar energy heating system.

In accordance with the present invention, it has been discovered that certain organic amines serve effectively for storage of thermal energy in a range of temperatures which, for each of these compounds, includes its melting and freezing points. More particularly, it has been found that these amine compounds have exceptionally high heats of fusion and also exhibit relatively high thermal conductivities. As a consequence of the high heat of fusion, it is possible to store substantial quantities of energy in a relatively low mass and compact volume of material by melting the material upon absorption of heat from a heat source having a temperature above the melting point and releasing the heat of fusion to a heat sink having a temperature below the freezing point.

High thermal conductivity of the phase change material contributes to relatively rapid absorption and release of heat per unit area of heat transfer surface between the phase change material and its surroundings. From this singularly favorable combination of moderate melting point, high heat of fusion, and relatively high thermal conductivity, the organic amines used in the method and system of this invention provide unique advantages that are not afforded by conventional thermal storage materials.

Hexamethylenediamine, a material whose melting point is at the relatively moderate temperature of 41° C. is a preferred phase change material for use in the method and system of the invention. It has been found that hexamethylenediamine has an unusually high heat of fusion of 86.2±2.9 calories per gram (higher even than H₂O), and a thermal conductivity of 0.0021 g. cal./cm. sec.°C. in the solid state. As compared to typical organic compounds, these thermal conductivities are quite high and contribute significantly to effective heat transfer. Generally it has been found that aliphatic amines corresponding to the general formula $$H_2N-(CH_2)_n-NH_2,$$

where n is an integer between 4 and 14 inclusive, serve effectively as phase change materials in the systems and methods of the inventions. Particular phase change materials which can be used advantageously in a thermal energy storage system include bis(hexamethylene)triamine, having a melting point of 36.9° C. (96.3% purity) and a heat of fusion of 67.2 cal/g.; 1,8-diaminooctane, having a melting point of 52.6° C. and a heat of fusion of 85.8 cal/g.; 1,12-diaminododecane, having a melting point of 67.2° C. and a heat of fusion of 80.6° C.; 1,7-diaminoheptane, having a melting point of 28.3° C. and a heat of fusion of 84.5 cal/g.; tetramethylenediamine, having a melting point of 27.7° C. and a heat of fusion of 87.4 cal/g.; pentamethylenediamine, having a melting point of 15.9° C. and a heat of fusion of 73.4 cal/g.; 3-aminobutylcyclohexylamine having a melting point of 26° C. and a heat of fusion of 39.7 cal/g., 1,9-diaminononane having a melting point of 38.0° C. and a heat of fusion of 76.9 cal/g.; 1,10 diaminodecane having a melting point of 61.9° C. and a heat of fusion of 85.3 cal/g.; 1,14-diaminotetradecane having a melting point of 73.3° C. and a heat of fusion of 72.2 cal/g.; and p-phenylenediamine having a melting point of 140° C. and a heat of fusion of 56.2 cal/g.

For any particular application, the phase change material utilized preferably has a melting point roughly centered between that of the heat source and that of the heat sink. Other important considerations include availability and cost; and it is these factors, as well as its moderate 41° C. melting point, which make hexamethylenediamine a preferred phase change material for solar energy applications. Other materials, such as p-phenylenediamine, whose melting point is relatively high, may be uniquely suitable for certain applications of the system of the invention for recovery of industrial process waste heat.

Although for some services the phase change material is preferably constituted essentially entirely of a single compound, mixtures of the aforesaid amines with each other are also contemplated. Eutectic mixtures, in particular, may be advantageous in providing a phase change material having a melting point lower than that of its constituent materials. A relatively low melting eutectic, for example, one having a melting point of less than 10° C., may be used to advantage in a refrigeration system wherein relatively cool ambient air is used as a heat sink for withdrawing heat from a heat source. Other phase change materials useful in the invention include mixtures of at least one of the aforesaid amines with water or with another agent for lowering the melting point of the amine. Among such agents are cyclic imines such as hexamethyleneimine. Water forms solid hydrates in equilibrium with liquid water. Of particular interest are mixtures of hexamethylenediamine with either water or hexamethyleneimine.

Any melting point lowering agent should be compatible with the amine. Such agents are considered compatible if the mixture forms no more than one liquid phase, undergoes no chemical reaction other than a reversible reaction associated with the phase change, and does not undergo gross phase segregation such as to interefere with the reversibility of the phase change.

Other materials such as fire retardants may also be contained in the heat storage mass, provided that there as no intolerably adverse effects on the melting point and homogeneity of the mass.

It may thus be seen that a phase change thermal storage system containing one of the above described materials can be used in a variety of applications including both active systems for energy collection and use and passive systems for temperature modulation. Prominent applications for active energy collection include solar energy systems for residential heating and heating of water, as well as systems for recovery of low temperature waste process heat. In passive systems, cycles in the temperature of the surroundings may be modulated by absorption of heat from the surroundings when the ambient temperature exceeds the melting point of the phase change material and release of heat to the surroundings when the temperature thereof is lower than the material's freezing point. Thus, for example, internal wall or ceiling panels containing 3-aminobutylcyclohexylamine (melting point 26° C.) may be used to modulate day/night temperature variations by release of heat upon freezing during the night and absorption of heat upon melting during the day.

Turning to consideration of active systems, FIG. 1 may be seen to illustrate a typical system of the invention for collection and utilization of solar energy. Shown at 1 is a solar collector which includes means for transfer of heat energy to a heat transfer fluid. The collector is used to gather energy for delivery to a heat sink via a heat delivery means (heat exchanger) 3 which may, for example, be the coil of a hot water heater or a residential radiator. A pump or blower 5 provides for circulation of a heat transfer fluid between collector 1 and exchanger 3 so that energy incident upon the collector can be transported to the heat sink via the fluid. A circulating line 7 provides a closed circulating system interconnecting collector 1, pump or blower 5, and exchanger 3.

Interposed between collector 1 and pump or blower 5 in line 7 is a heat exchanger 9 having a passage 11 therethrough for flow of heat transfer fluid and a compartment 13 containing a heat storage mass 14 comprising a phase change heat storage material of the type discussed above. A wall 15 of container 13 divides it from passage 11 and provides an area for transfer of heat between the phase change material and a fluid moving through passage 11 over the outside surface of the compartment wall.

A line 17 and valves 19 and 21 allow collector 1 to be by-passed while circulating heat transfer fluid between heat storage exchanger 9 and heat delivery exchanger 3. Similarly, a line 23 and valves 25 and 27 allow for by-pass of exchanger 3, while a line 29 and valves 31 and 33 allow exchanger 9 to be by-passed. Thus, the system of FIG. 1 can be alternatively arranged for series circulation of fluid between solar collector 1, exchanger 9 and exchanger 3 for simultaneous delivery of heat to the heat sink and storage of heat in the phase change material in compartment 13; circulation only between collector 1 and exchanger 9 for storage of heat by melting the material in compartment 13; circulation only between exchanger 9 and exchanger 3 for release of heat from compartment 13 by freezing of the phase change material therein; and circulation only between collector 1 and exchanger 3 in those instances where the heat is being removed by the heat sink at a rate which is closely in balance with the rate at which energy is received by collector 1.

Air and water are preferred as the heat transfer fluids for transport of energy between collector 1, storage exchanger 9 and heat sink exchanger 3 in a system such as that of FIG. 1. In typical solar systems air is most preferred. Alternatively, however, other gases or liquids may be used. Where water or another liquid is used, as vented surge tank 35 is provided at the suction of pump 5 to control system pressure and provide suction head for the pump flow of such heat transfer fluid can be controlled during the heat storage and heat delivery modes by a system of values as described below. If desired, different heat transfer fluids may be used for the heat storage and heat delivery modes of the thermal energy storage system.

In operation of the system of FIG. 1 in accordance with the method of the invention, pump or blower 5 circulates heat transfer fluid through line 7, collector 1, exchanger 9 and exchanger 3. In the start-up phase, the collector is necessarily a part of the circuit. Whether start-up operation involves series circulation between exchanger 9 and exchanger 3, by-passing one or the other exchangers, or splitting of the flow between exchangers 3 and 9, depends on the circumstances of the particular operation. However, in a typical system, exchanger 3 might initally be by-passed by closing valve 27 and opening valve 25. Circulation of fluid heated at collector 1 through exchanger 9 over the outside surface of wall 15 causes the phase change material in compartment 13 to be heated and melted, thereby providing stored thermal energy. Thereafter, circulation may be altered to include exchanger 3 by closing valve 25 and opening valve 27. If the sun is still shining on collector 1, the fluid may typically be circulated through line 7 to both exchangers and the collector in series (with or without partial by-passing of one or the other exchanger). In time of darkness, collector 1 may be by-passed by closing valve 21 and opening valve 19, whereby the fluid circulates only between exchanger 3 and exchanger 9. Heat is released to the fluid passing over the outside of wall 15 by freezing of the phase change material in compartment 13 and the fluid so heated is transferred by pump or blower 5 to exchanger 3 where the energy is transferred to the heat sink.

Figure 2:
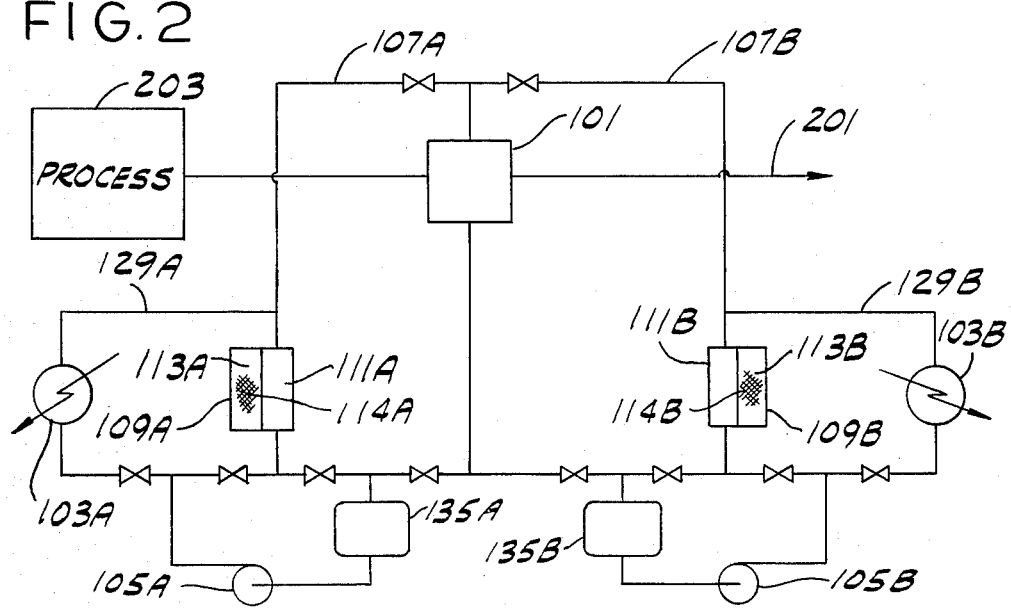
FIG. 2 is a schematic flow diagram illustrating a system of the invention for recovery of low temperature waste process heat.

FIG. 2 illustrates an embodiment of the invention in which waste process heat is recovered. In this system there are two exchangers, 109A and 109B, having compartments 113A and 113B each containing heat storage mass (114A,B) comprising a phase change material of the above noted type. Each exchanger further includes a passage 111A,B through which a heat transfer fluid is circulated by a pump or blower 105A,B. In the embodiment as shown, the heat collection means comprises a single waste heat exchanger 101 disposed in a line 201 containing waste heat from an industrial processing facility 203. Each of exchangers 109A,B is alternately in circulation with exchanger 101 via line 107A,B or in circulation with a heat exchanger 103A,B via line 129A,B. Each of exchangers 103A,B constitutes means for delivery of process waste heat to a heat sink, for example, for space heating, preheating of process materials, heating of process wash water, etc.

When exchanger 109A is in circulation with exchanger 103A for delivery of heat by freezing of the phase change material in compartment 113A, exchanger 109B is in circulation with exchanger 101 for storage of waste process heat through melting of the phase change material in the compartment 113B. When the material in compartment 113A is substantially frozen and that in 111B is molten, the valves (not numbered) are switched so that exchanger 109A is in circulation with waste heat exchanger 101 and exchanger 109B is in circulation with exchanger 103B for delivery of heat.

In a simplified embodiment of the process of FIG. 2, the circulating loop through exchanger 101 may be eliminated and the process fluid containing waste heat from process 203 is passed alternately through exchangers 109A,B.

Figure 3:
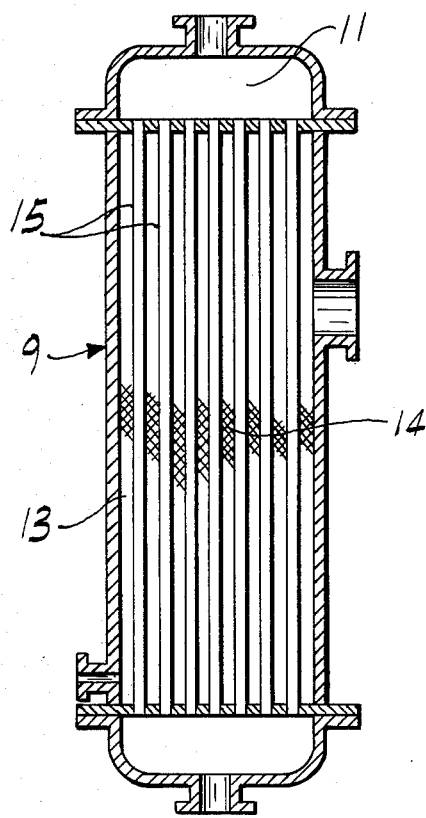
FIG. 3 shows a shell and tube heat exchanger for use in transfer of heat to or from a phase change material in which thermal energy is stored.

FIG. 3 illustrates a shell and tube heat exchanger which may be used as exchanger 9 (or 109). In this exchanger the shell side comprises the compartment 13 (113) within which the phase change material 14 (114) is contained and the tube side 11 is the passage through which the heat transfer fluid is passed. In operation of the method of the invention, heat flows through walls 15 of the tubes. In the present context (somewhat anomalously perhaps) the inside surfaces of the tube walls constitute the outside surfaces of walls 15 of compartment 13. In a further alternative embodiment where the phase change material is inside the tubes and the heat transfer fluid is passed through the shell side, the outsides of the tubes constitute the outside surface of the compartment walls.

Figure 4:
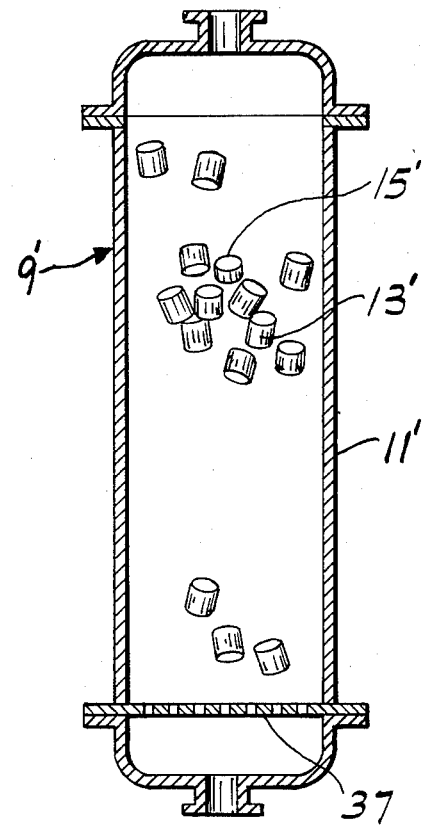
FIG. 4 illustrates an alternative form of heat exchanger in which the phase change material is hermetically sealed within canisters.

FIG. 4 illustrates a still further alternative embodiment of exchanger 9' in which the phase change materials are contained and hermetically sealed within a plurality of discrete closed containers or canisters 13' having outside walls 15'. The canisters are in turn contained within a pipe column 11' which provides a passage for heat transfer fluid over the outside surfaces of walls 15'. The canisters are conveniently supported in column 11' on a perforated plate 37.

Although not shown in the drawings, in a still further embodiment of the invention, the compartment containing the phase change material may constitute a tank or other vessel through which the heat transfer fluid is passed for contact heat exchange with the phase change material. Such alternative system is rendered practical by the relatively low vapor pressure exhibited by the above-noted phase change materials in the range of operation of the thermal storage system. In this embodiment, area for transfer of heat between the fluid and the phase change material is provided, for example, by fashioning compartment 11 in the form of a wide shallow tank or trough.

Figure 5:
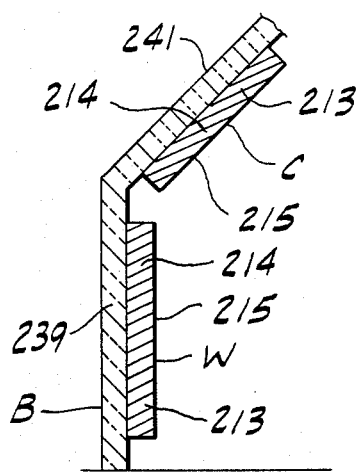
FIGS. 5 and 6 illustrate alternative passive thermal energy systems of the invention used for temperature buffering.
Figure 6:
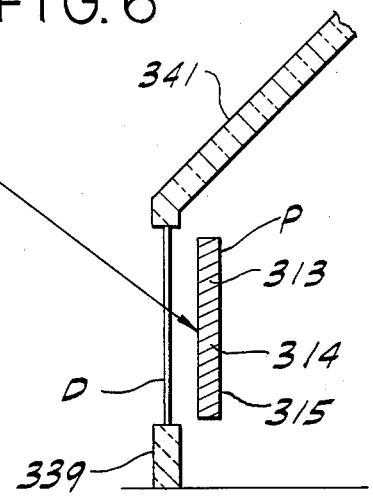

FIGS. 5 and 6 illustrate typical passive systems in which wall or ceiling heat storage panels (comfort panels) absorb heat energy from its environment during daytime (or other high temperature portion of a regular temperature cycle) and releases stored energy to the surroundings during the night (or other low temperature portion of a regular temperature cycle). In the system of FIG. 5, a wall panel W and ceiling panel C, each comprising a compartment 213 containing a heat storage mass 214, are adapted to absorb heat from and release heat to the interior of a building B having an outside wall 239 and roof 241. In the system of FIG. 6 direct energy gain from the sun S is provided by positioning a panel P comprising a compartment 313 containing a heat storage mass 314 adjacent a window D. The panel gains both radiant heat from the sun and convective heat from the surrounding air inside the building. Whenever the temperature of the heat storage mass exceeds that of the inside air, convective heat loss from panel P contributes heat to the building.

For passive environmental temperature buffering systems of the type illustrated in FIGS. 5 and 6, it is desirable to use a phase change material whose melting point is as close as possible to the desired control temperature. A deviation of even 4°-6° C. from the control temperature has a significant adverse effect on the buffering capability of a passive thermal energy storage system. It has been discovered that an especially advantageous phase change material is comprised of a eutectic mixture of hexamethylenediamine and bis(hexamethylene)triamine, containing between 50 and 60% by weight bis(hexamethylene)triamine. This mixture exhibits a melting point of between about 24° and 25° C. and a heat of fusion of approximately 65-70 cal/g.

Because the organic amines useful in the thermal energy storage systems of this invention are subject to subcooling, it is preferable for the heat storage mass to contain a nucleating agent for the phase change material. Although we do not wish to be bound to any particular theory it is believed that the crystalline form of the phase change material is a highly ordered system whose stability is enhanced by relatively strong hydrogen bonding forces between adjacent molecules. Such hydrogen bonding forces are believed to contribute to the unusually high heat of fusion of the phase change material but the highly ordered low entropy nature of the crystalline phase is also believed to contribute to the tendency toward subcooling.

It has been found that the hydrohalides of cysteine and tris(hydroxymethyl)aminomethane are uniquely effective as nucleating agents for the organic amine phase change materials used in the systems of this invention.

The following examples illustrate the invention.

EXAMPLE 1

Figure 7:
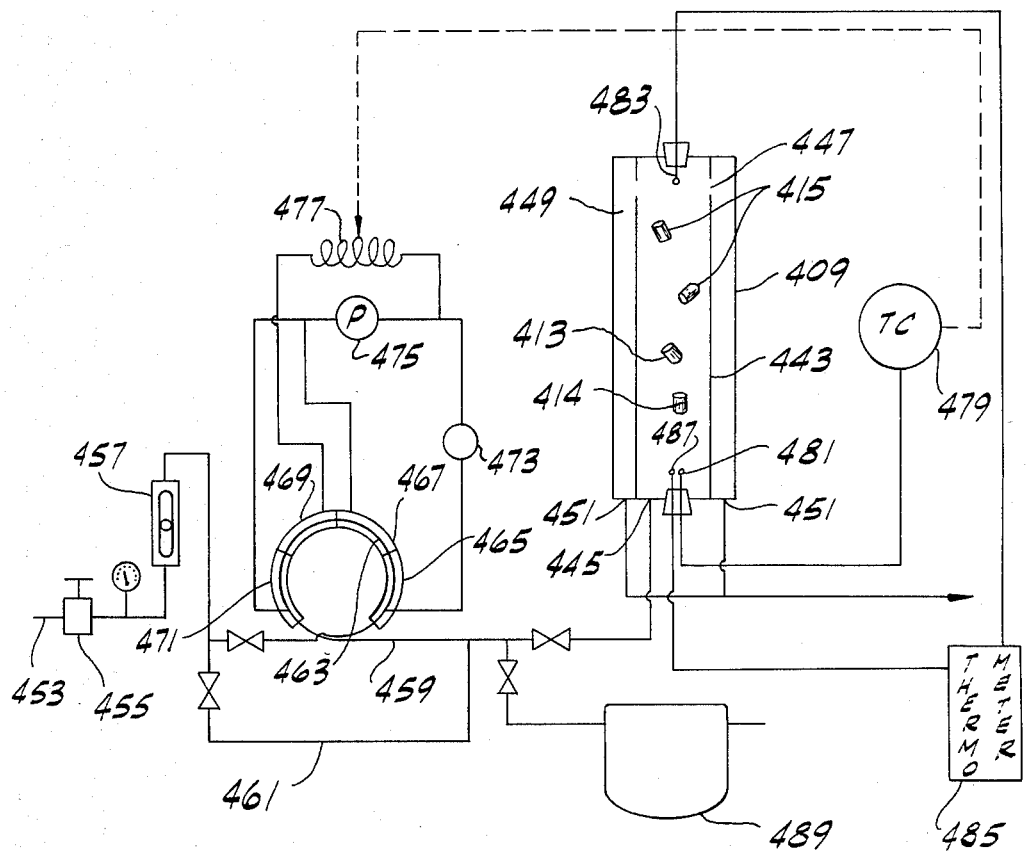
FIG. 7 is a schematic diagram of a test apparatus used to demonstrate the effectiveness of hexamethylenediamine as a phase change heat storage material.

The efficacy of hexamethylenediamine as a phase change heat storage material was demonstrated using the test apparatus illustrated in FIG. 7.

Shown at 409 in FIG. 7 is a heat exchanger containing a plurality of canisters 413 which constitute compartments containing hexamethylenediamine phase change material 414. Exchanger 409 is cylindrical in construction and contains a concentric internal baffle 443 into which a fluid to be heated or cooled is introduced through a fluid inlet 445 at the bottom of the exchanger. Fluid which has flowed over canisters 413 passes through openings 447 at the top of baffle 443 and into an annular chamber 449 defined by the baffle and the outer wall of exchanger 409. From the annular chamber, the fluid passes out of the exchanger through fluid outlet ports 451.

A supply of air for passage through exchanger 409 is provided by way of a supply line 453 and a pressure regulator 455. The rate of air flow is measured by a rotameter 457. From the rotameter the air is delivered to inlet port 445 via either a heated air line 459 or a cold air by-pass line 461. Heated air line 459 contains a loop 463 wrapped with an electric resistance heating mantle comprised of four electric heating tapes 465, 467, 469 and 471. A constant head load is applied to tapes 465 and 467 through a Variable transformer 473 connected to a power source 475. Power to tapes 469 and 471 is provided through a variable transformer 477 that is controlled by a temperature controller 479 in response to measurement of the inlet air temperature as sensed by a thermocouple 481. Exit temperature is sensed by a thermocouple 483 and displayed at a thermometer 485 which also displays the inlet temperature sensed by a second inlet thermocouple 487.

Rotameter 457 is calibrated by diversion of the air stream through a gas meter 489.

Figure 8:
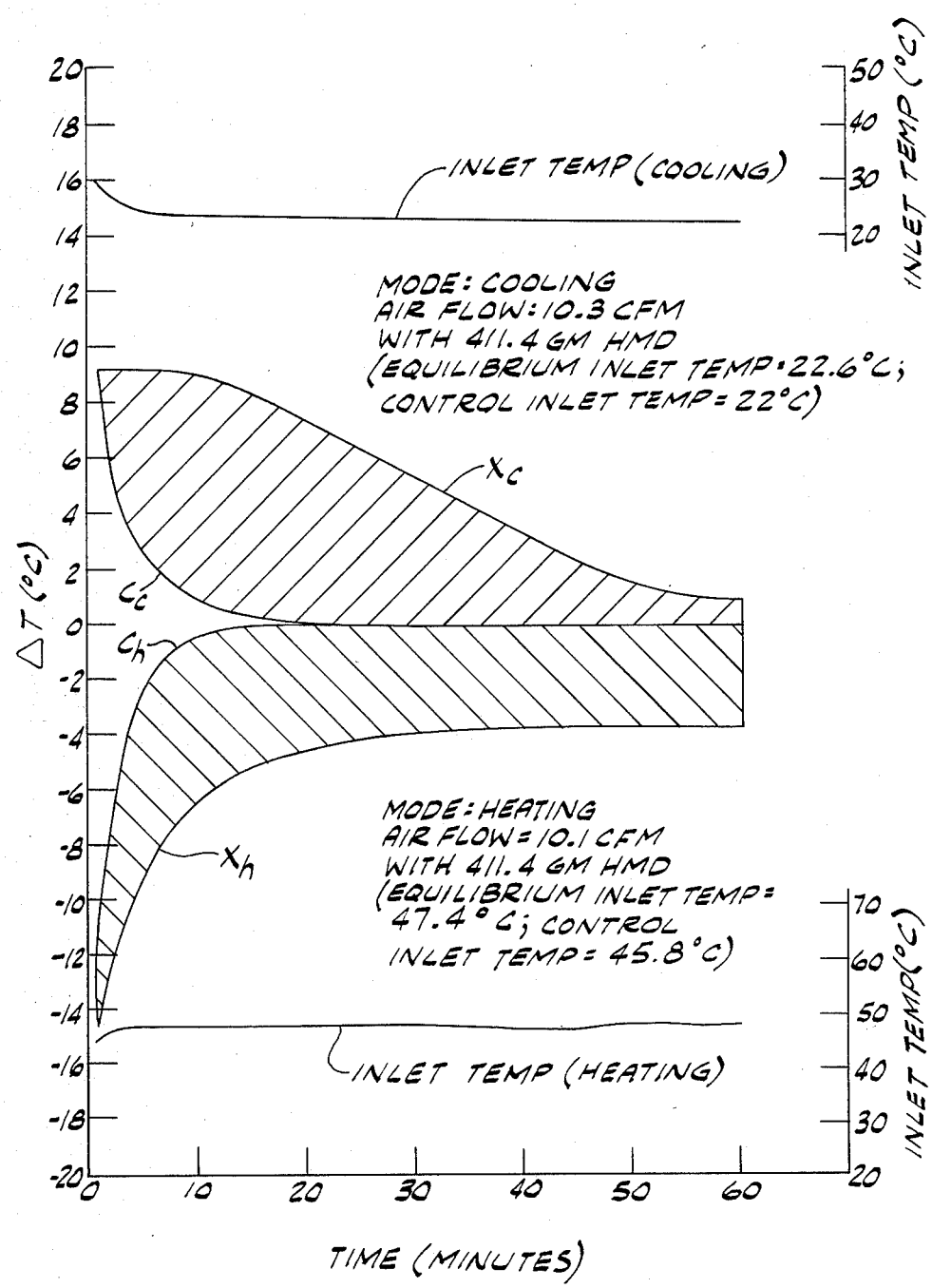
FIGS. 8-11 represent temperature profiles obtained in tests conducted with the apparatus shown in FIG. 7.

To provide a basis of comparison, a control run was made initially with containers 413 empty. In the heating mode, air was passed through exchanger 409 at a rate of 10.1 cubic feet per minute at an inlet temperature of 45.8° C. Both inlet and outlet temperatures were recorded as a function of time and a plot prepared of the difference between inlet and outlet temperature. This plot is set forth as curve $C_h$ in FIG. 8. A control cooling cycle was run with an air flow 10.3 cubic feet per minute and an inlet air temperature of 22° C. The outlet vs. inlet temperature differential was plotted as a function of time and is shown in FIG. 8 as curve $C_c$.

Containers 413 were then filled with a total of 411.4 g. of hexamethylenediamine, placed inside baffle 443 of heat exchanger 409 and subjected to heating and cooling cycles using the same air flow rates as in the control tests. In the heating mode the equilibrium inlet temperature was 47.4° C. while in the cooling mode the equilibrium inlet temperature was 22.6° C. Plots of the difference between the outlet and inlet temperatures as function of time are shown in FIG. 8 as curves $X_h$ for the heating cycle and $X_c$ for the cooling cycle. The negative differential over an extended period of time during the heating cycle indicates substantial absorption of heat by the heat storage mass within containers 413 resulting from the melting of hexamethylenediamine, and the maintenance of a substantial positive temperature differential over time during the cooling cycle is indicative of the release of stored energy by crystallization of the molten hexamethylenediamine.

The total quantities of heat energy stored and released in the heating and cooling cycles, respectively, are determined by integration over time of the product of the air flow rate, the specific heat of air, and the temperature difference between control and operating curves. This integration may be carried out by measurement of the area of the crosshatched region between the curves. Thus, in the heating cycle of FIG. 8, the area between the curves is 260 min °C. so that, at an air flow rate of 345 g/min and an air heat capacity of 0.24 cal/g. °C., the total heat stored was 21,500 cal. On the cooling cycle the crosshatched area is 278 min °C. and the air rate 352 g/min, indicating a total heat release of 23,500 cal.

EXAMPLE 2

Figure 9:
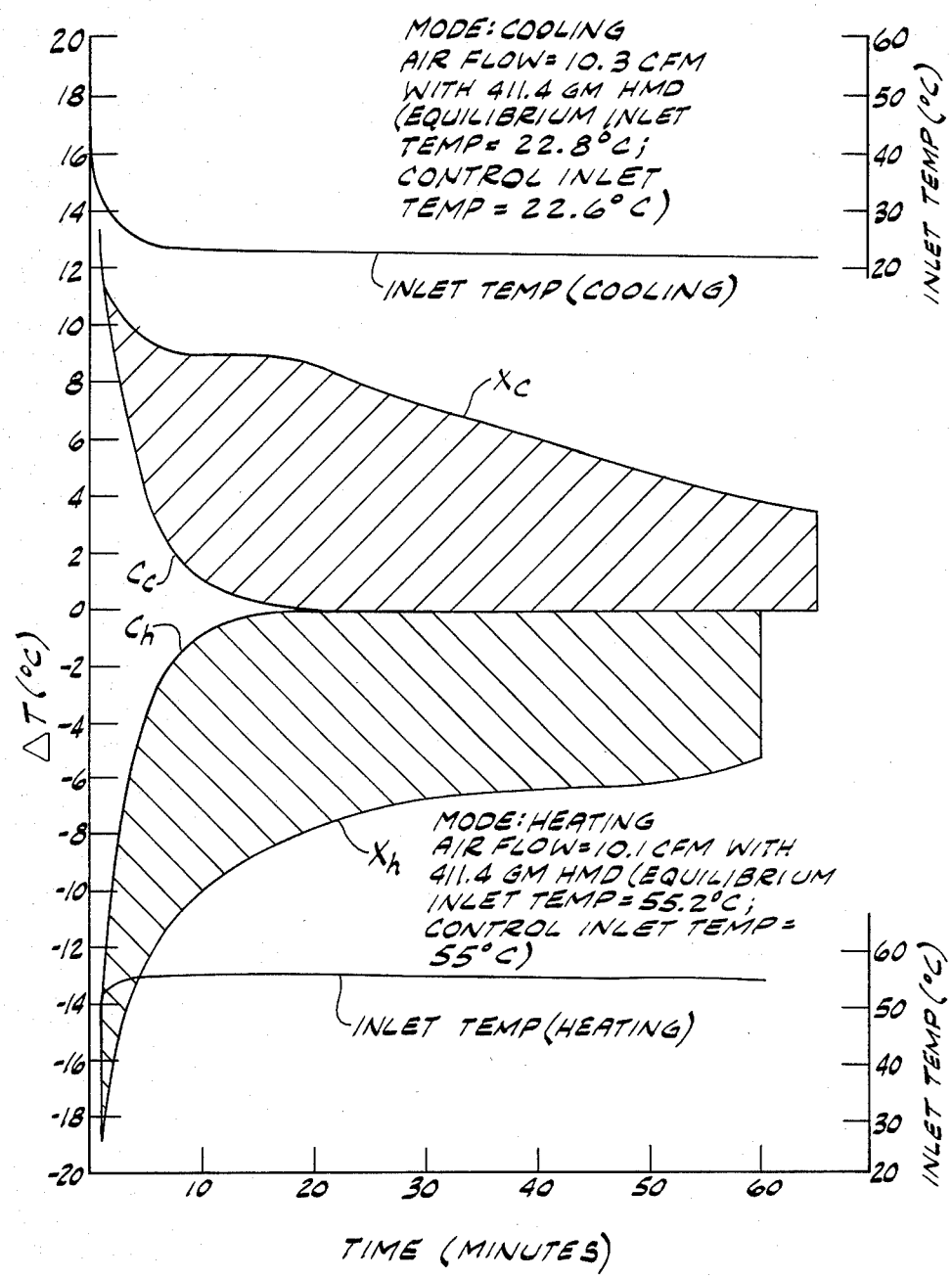

Using the apparatus illustrated in FIG. 7 and described in Example 1, additional tests were conducted to demonstrate the effectiveness of hexamethylenediamine as a heat storage material. In the heating cycle, the air flow was 10.1 cubic feet per minute, and the inlet air temperature of 55° C. for the control tests and 55.2° C. for the tests in which the containers held hexamethylenediamine. In the cooling cycle, air flow was 10.3 cubic feet per minute, and the inlet air temperature was 22.6° C. during the control test and 22.8° C. during the tests with hexamethylenediamine in the containers. As in Example 1, the containers held 411.4 g. of hexamethylenediamine. Plots showing the inlet temperatures and temperature differentials for the control and filled container runs of this example are set forth in FIG. 9. Curve labeling is the same as in FIG. 8.

Integration of the crosshatched areas between the control and opertating curves indicates a heat absorption of 34,200 cal. during the heating cycle and a heat release of 32,800 cal. during the cooling cycle.

EXAMPLE 3

Figure 10:
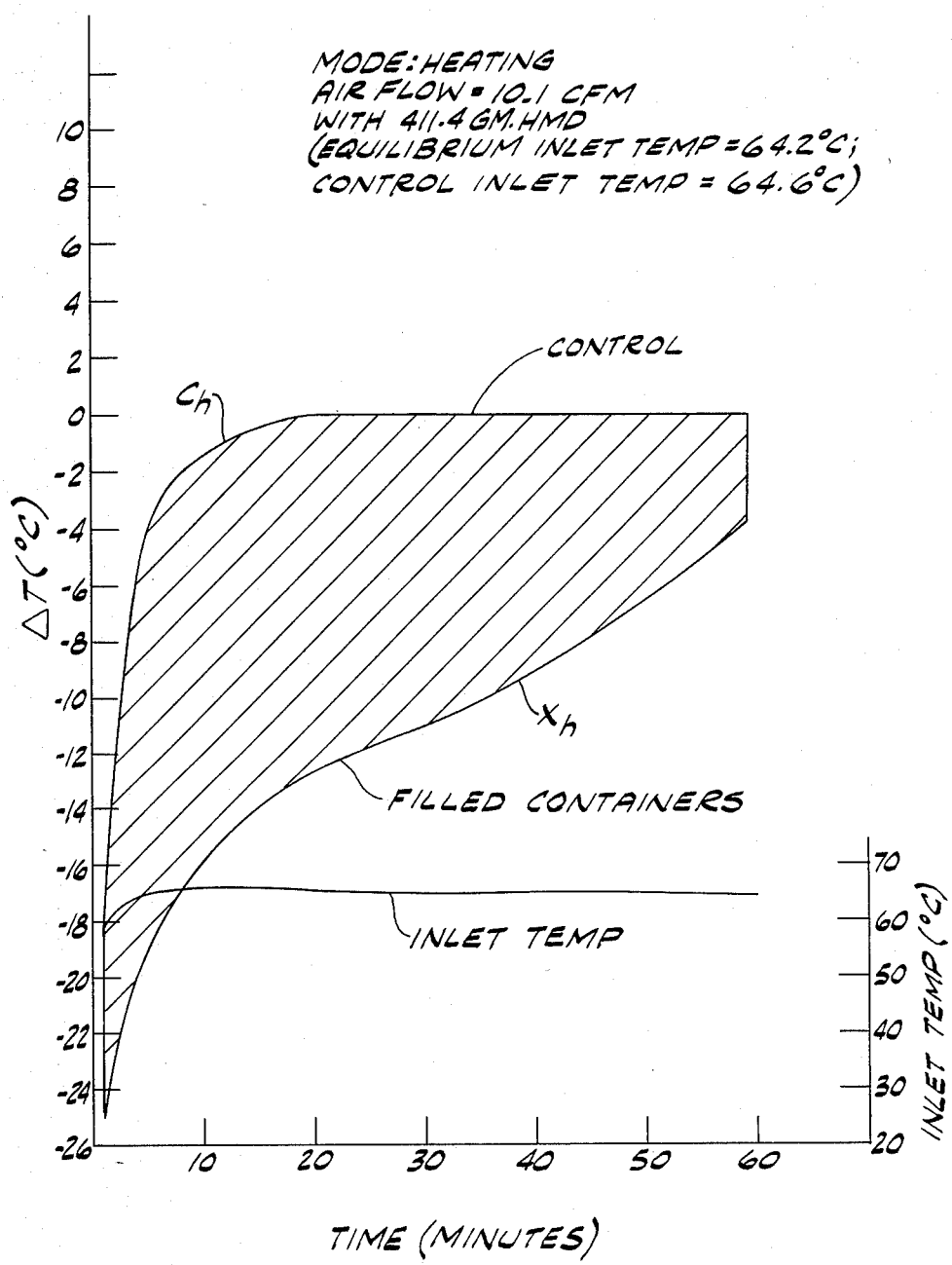
Figure 11:
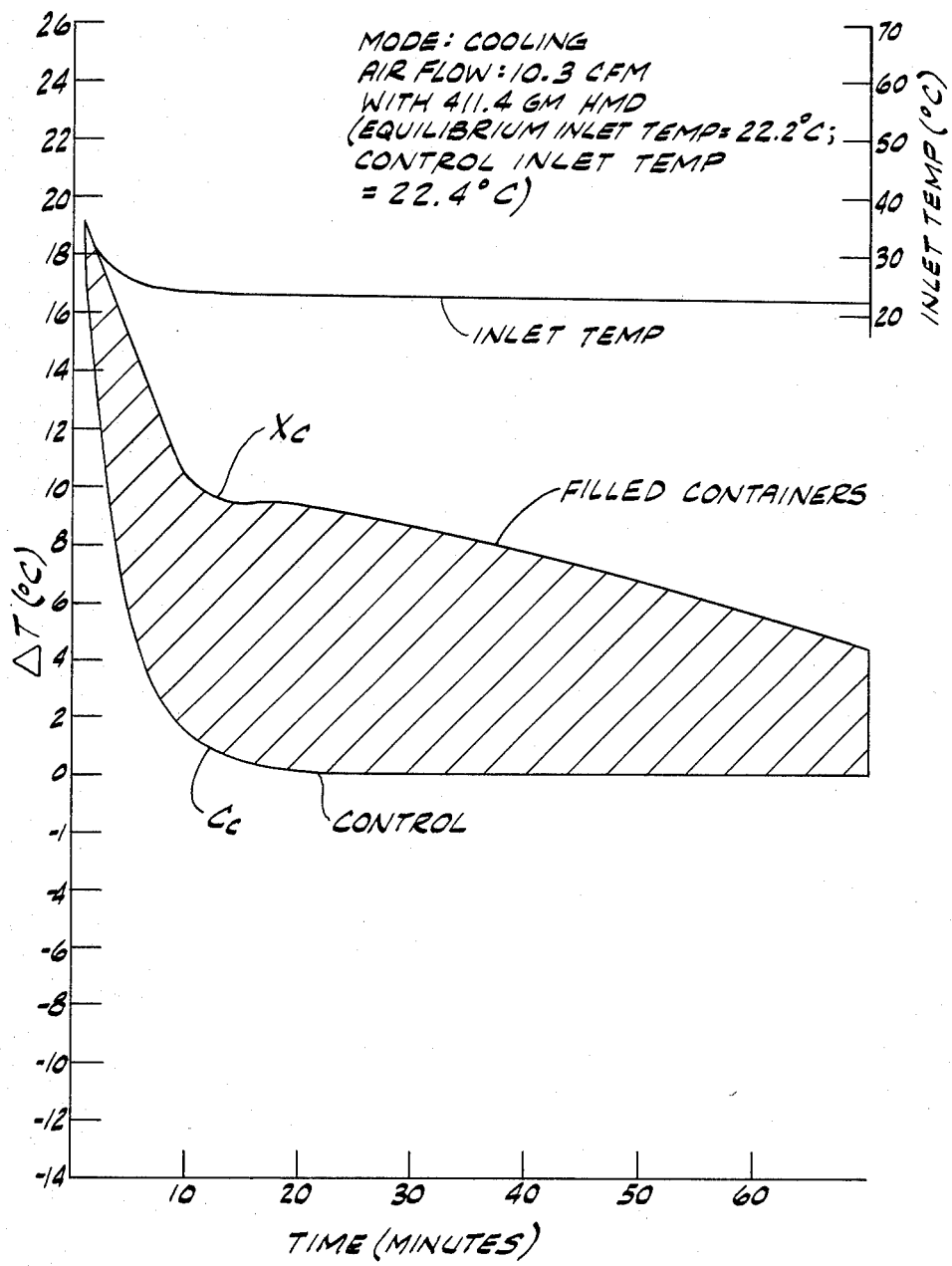

A further demonstration was conducted using the apparatus and method described in Example 1. In the demonstration of this example, the containers again held a total of 411.4 g. of hexmethylenediamine. During the heating cycle the inlet temperature was 64.6° C. for the control run and 64.2° C. for the run in which the exchanger contained hexamethylenediamine. For the cooling cycle, the inlet temperature was 22.4° C. for the control run and 22.2° C. for the run with hexamethylenediamine. All runs were at an air rate of 10.1 ft.$^3$/min. Plots of the inlet air temperature and heating curves from the heating cycle are set forth in FIG. 10 while the plots of the inlet air temperature and cooling curves for the cooling cycle are set forth in FIG. 11.

From the crosshatched areas between control and operating curves, it was determined that heat absorption on the heating cycle was 48,300 cal. and heat release on the cooling cycle was 43,400 cal.

EXAMPLE 4

Using a duPont model 990 differential scanning calorimeter, melting points, crystallizing points and heat of fusion were determined for hexamethylenediamine, bis(hexamethylene)triamine, 1,4-diaminobutane, pentamethylenediamine, 1,8 diaminooctane, 1,9 diaminononane, 1,12-diaminododecane, 1,7-diaminoheptane, 1,10-diaminodecane and 1,14-diaminotetradecane. In determining melting point, the sample of the amine tested was heated at a rate of 10° C./minute while during the crystallizing point determination the sample was cooled at a rate of 0.5° C./minute. The samples were hermetically sealed in gold pans and prepared inside a dry box before the measurement. Set forth in Table I are the data obtained in these analyses.

EXAMPLE 5

In order to reduce the extent of subcooling, a small amount of tris(hydroxymethyl)aminomethane hydrochloride was mixed with hexamethylenediamine. Using the differential scanning calorimetry technique referred to in Example 4, melting point and crystallizing point determinations were made on the samples of the mixture containing the nucleating agent. Onset of crystallization was observed at 29.3±0.5° C.

EXAMPLE 6

Mixtures were prepared of bis(hexamethylene)triamine and hexamethylenediamine, and differential scanning calorimetry tests run to determine melting points thereof. From these tests it was discovered that a eutectic was formed exhibiting a melting point plateau in the range of 24°-25° C. at a concentration of roughly 50-60% by weight bis(hexamethylene)triamine. Results of the calorimetry tests for samples within the observed eutectic range are set forth in Table II.

TABLE I

Calorimetric Measurements for Organic Amines

| Material | Melting Scan (10° C./min) Onset of Melting (°C.) | Peak (°C.) | Melting Point (°C.) | Cooling Scan (0.5° C./min.) Onset of Crystallization (°C.) | Heat of Fusion (cal/g) |
| --- | --- | --- | --- | --- | --- |
| Hexamethylenediamine | 40.7 ± 0.1 | 42.4 ± 0.6 | 40.7 ± 0.1 | 19.6 | 86.2 ± 2.9 |
| Bis(hexamethylene) triamine | 36.4 ± 0.0 | 38.3 ± 0.9 | 36.9 ± 0.4 | 28.1 ± 0.2 | 67.2 ± 1.5 |
| 1,4-Diaminobutane | 27.3 ± 0.1 | 29.6 ± 0.5 | 27.7 ± 0.0 | 8.9 ± 1.8 | 87.4 ± 0.2 |
| Pentamethylenediamine | 13.1 ± 0.2 | 17.6 ± 0.4 | 15.9 ± 0.3 | −9.6 ± 0.3 | 73.4 ± 1.0 |
| 1,8-Diaminooctane | 52.0 ± 0.3 | 54.1 ± 0.2 | 52.6 ± 1.5 | 40.2 ± 1.5 | 85.8 ± 9.2 |
| 1,12-Diaminododecane | 65.1 ± 0.1 | 68.7 ± 1.2 | 67.2 ± 0.4 | 55.7 ± 1.7 | 80.6 ± 6.2 |
| 1,7-Diaminoheptane | 27.8 ± 0.6 | 30.4 ± 0.7 | 28.3 ± 0.6 | 12.0 ± 2.0 | 84.5 |
| 1,9-Diaminononane | 37.1 ± 0.3 | 39.4 ± 0.2 | 38.0 ± 0.3 | | 76.9 ± 4.3 |
| 1,10-Diaminodecane | 60.4 ± 0.1 | 62.7 ± 0.2 | 61.9 ± 0.6 | | 85.3 ± 2.7 |
| 1,14-Diaminotetradecane | 70.4 ± 0.1 | 74.5 ± 0.5 | 73.3 ± 0.1 | | 72.2 ± 2.8 |

TABLE II

Calorimetric Measurements for BHMT[a]/HMD[b] Mixtures

| Weight Proportion BHMT | Onset of Melting (°C.) | Peak (°C.) | Melting Pt. (°C.) | Heat of Fusion (cal/g) |
| --- | --- | --- | --- | --- |
| 50.5%[c] | 20 | 26.9 | 24.9 | 69.3 |
| 50.5%[d] | 20 | — | 24.1 | 67.4 |
| 54.9% | 20.3 ± 0.5 | 25.8 ± 0.5 | 24.1 | 69.0 ± 1.9 |
| 59.7 | 19.7 | 26.2 | 24.7 | 56.6 |

[a]bis(hexamethylene) triamine
[b]hexamethylenediamine
[c]initially solid
[d]initially liquid On the cooling scan for the sample containing 54.9% by weight bis(hexamethylene)triamine, the onset of crystallization was observed at 17.6±0.7° C. Further tests were run using L-cysteine hydrochloride and tris(-hydroxymethyl)aminomethane hydrochloride as nucleating agents. When L-cysteine hydrochloride was used, the onset of crystallization was observed at 22.0±0.4° and when tris(hydroxymethyl)aminomethane hydrochloride was used, the onset of crystallization was observed at 20.9±0.4° C.

In view of the above, it will be seen that the several objects of the invention are achieved and other advantageous results attained.

As various changes could be made in the above methods and systems without departing from the scope of the invention, it is intended that all matter contained in the above description or shown in the accompanying drawings shall be interpreted as illustrative and not in a limiting sense.

What is claimed is:

1. A thermal energy storage system for absorption of heat from a heat source having a temperature above a predetermined temperature and release of heat to a heat sink having a temperature below said predetermined temperature, said system comprising a heat storage mass comprising a condensed state material which changes between the solid and liquid phases at about said predetermined temperature and a compartment for containing said mass, said compartment including means providing an area for transfer of heat between a heat transfer fluid and said material, said material being selected from the group consisting of aliphatic diamines having the structural formula $$H_2N-(CH_2)_n-NH_2$$

where n is an integer between 4 and 14 inclusive, bis(-hexamethylene)triamine, 3-aminobutylcyclohexyla- mine, p-phenylenediamine, mixtures of said amines with each other, mixtures containing at least one of said amines and water, and mixtures containing at least one of said amines and an agent for lowering the melting point thereof.

2. A system as set forth in claim 1 wherein said heat transfer means comprises a wall of said compartment over the outside surface of which said heat transfer fluid may be passed.

3. A system as set forth in claim 2 further comprising heat collection means for transferring heat from an external source to a first heat transfer fluid for heating said first heat transfer fluid to a temperature above the melting point of said material, means for transporting said first heat transfer fluid heated by said external source to said surface for transfer of heat to said material and melting thereof;

means for transporting a second heat transfer fluid which may be the same as different from said first heat transfer fluid, to said outside surface of said wall of said compartment for absorption of heat from said material wherein said second heat transfer fluid is at a temperature below the freezing point of said material;

and heat delivery means for transferring heat to a heat sink from said second fluid heated by absorption of heat from said material.

4. A system as set forth in claim 3 wherein said heat collection means for transferring heat from said external source comprises a solar energy collector.

5. A system as set forth in claim 3 or 4 wherein said first heat transfer fluid to which heat is transferred from said external source comprises a gas.

6. A system as set forth in claim 5 wherein said gas comprises air.

7. A system as set forth in claim 4 further comprising means for circulating said first heat transfer fluid between said collection means and said outside surface of said wall of said compartment.

8. A system as set forth in claim 7 further comprising means for circulating said second heat transfer fluid between said heat delivery means and said outside surface of said wall of said compartment.

9. A system as set forth in claim 8 comprising a closed fluid circulating system containing valve means for alternatively circulating said heat transfer fluid contained therein in a first circuit between said heat collection means and said compartment and a second circuit between said compartment and said heat delivery means.

10. A system as set forth in claim 9 wherein said fluid circulating system provides for series circulation of said heat transfer fluid between said collection means, said compartment and said delivery means.

11. A system as set forth in claim 3 wherein said heat source comprises a hot fluid effluent stream from an industrial processing facility and said collection means comprises a heat exchanger for waste heat recovery.

12. A system as set forth in claim 2 wherein said compartment is contained in a surface heat exchanger.

13. A system as set forth in claim 12 wherein said surface heat exchanger comprises a shell and a tubular heat exchanger wherein said compartment is defined by a spaced between said shell and said tubular heat exchanger, wherein said heat exchange fluid flows through tubes of said tubular heat exchanger.

14. A system as set forth in claim 12 wherein said heat exchanger contains a plurality of said compartments comprising a plurality of discrete closed containers dispersed in a vessel that is adapted for passage of said heat transfer fluid therethrough.

15. A system as set forth in claim 1 comprising a passive system for modulating the temperature of its surroundings by absorption of heat therefrom when the temperature of the surrounding exceeds the melting point of said material and release of heat to the surroundings when the temperature thereof is lower than the freezing point of said material.

16. A system as set forth in claim 15 wherein said heat transfer means comprises a wall of said compartment, the outside surface of said wall being in contact with a said heat transfer fluid which comprises the surroundings whose temperature is to be modulated.

17. A system as set forth in claim 16 wherein the melting point of said phase change material is below the upper temperature portion of a regular temperature cycle of said surroundings and above the lower temperature portion of said cycle.

18. A system as set forth in claim 1 wherein said material comprises hexamethylenediamine.

19. A system as set forth in claim 1 wherein said heat storage mass comprises a mixture of said phase change materials and a nucleating agent therefor.

20. A system as set forth in claim 19 wherein said nucleating agent is selected from the group consisting of cysteine hydrochloride and tris(hydroxymethyl)aminomethane hydrochloride.

21. A system as set forth in claim 1 wherein said phase change material comprises a eutectic mixture of bis(hexamethylene)triamine and hexamethylenediamine.

22. A system as set forth in claim 12 wherein said heat storage mass comprises a mixture of said phase change material and a nucleating agent therefor.

23. A system as set forth in claim 1 wherein said phase change material comprises a mixture of hexamethylenediamine and water.

24. A system as set forth in claim 1 wherein said phase change material comprises a mixture of hexamethylenediamine and hexamethyleneimine.

25. A solar heat collection system comprising:
a solar thermal energy collector comprising means for transfer of solar energy to a first heat transfer fluid,
heat storage means comprising a heat exchanger comprising a passage for flow of said first heat transfer fluid therethrough and a compartment containing a heat storage mass comprising a condensed state material which changes between the liquid and solid phases at a temperature below a temperature to which said heat transfer fluid may be raised by said solar collector, said compartment having a wall which divides it from said passage and through which heat may be transferred to said material from said first heat transfer fluid heated by said collector, said material being selected from the group consisting of aliphatic diamines having the structural formula

where n is an integer between 4 and 14 inclusive, bis(hexamethylene)triamine, 3-aminobutylcyclohexylamine, p-phenylenediamine, mixtures of said amines with each other, mixtures containing at least one of said amines and water and mixtures containing at least one of said amines and an agent for lowering the melting point thereof,
means for transporting said first heat transfer fluid heated by said solar collector to an outside surface of said wall for transfer of heat to said material and melting thereof,
means for transporting a second heat transfer fluid at a temperature below the freezing point of said material to said outside surface of said wall of said compartment for absorption of heat from said material and freezing thereof, and
heat delivery means for transferring heat to a heat sink from said second heat transfer fluid heated by absorption of heat from said material.

26. A method for absorbing heat from a source thereof and releasing heat to a heat sink comprising the steps of:
transferring heat from a heat source to a heat storage mass comprising a material having a melting point below the temperature of said source thereby causing said material to absorb energy by melting, said material being selected from the group consisting of aliphatic diamines having the structural formula

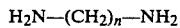

where n is an integer between 4 and 14 inclusive, bis(hexamethylene)triamine, 3-aminobutylcyclohexylamine, p-phenylenediamine, mixtures of said amines with each other, mixtures containing at least one of said amines and water, and mixtures containing at least one of said amines and an agent for lowering the melting point thereof; and
transferring heat from said material to a heat sink having a temperature below the freezing point of said material thereby causing said material to release energy by freezing.

27. A method as set forth in claim 26 wherein the temperature of the surroundings of said material is modulated by absorption of heat therefrom when the temperature of the surroundings exceeds said melting point and release of heat to the surroundings when the temperature thereof is lower than the freezing point of said material.

28. A method as set forth in claim 27 wherein the melting point of said phase change material is below the upper temperature portion of a regular temperature cycle of said surroundings and above the lower temperature portion of said cycle.

29. A method as set forth in claim 26 further comprising the steps of:
collecting energy in the form of heat from an external source;
transferring heat from said source to a first heat transfer fluid to heat said fluid to a temperature above the melting point of said material;
transferring heat from said fluid to said material to melt said material;
transferring heat from said melted material to a second heat transfer fluid having a temperature below the freezing point of said material thereby freezing said material; and
transferring heat to a heat sink from said second heat transfer fluid heated by transfer of heat from said material.

30. A method as set forth in claim 29 wherein said first heat transfer fluid is circulated between a means for collecting energy from said source and a means for transferring heat from said first fluid to said material, said collection means including means for transferring collected energy to said first heat transfer fluid in the form of heat.

31. A method as set forth in claim 30 wherein said second heat transfer fluid is circulated between said means for transferring heat from said material to said second heat transfer fluid and a heat delivery means for transferring heat from a fluid to a heat sink.

32. A method as set forth in claim 31 wherein said heat transfer fluid is circulated in series between said collection means, said means for heat exchange between said heat transfer fluid and said material, and said delivery means.

33. A method as set forth in claim 26 wherein said heat storage mass comprises a mixture of said phase change material and a nucleating agent therefor.

34. A method as set forth in claim 33 wherein said nucleating agent is selected from the group consisting of cysteine hydrochloride and tris(hydroxymethyl)aminomethane hydrochloride.

35. A method as set forth in claim 26 wherein said phase change material comprises a eutectic mixture of bis(hexamethylene)triamine and hexamethylenediamine.

36. A method as set forth in claim 35 wherein said heat storage mass comprises said mixture of said phase change material and a nucleating agent therefor.

37. A method as set forth in claim 36 wherein said nucleating agent is selected from the group consisting of cysteine hydrochloride and tris(hydroxymethyl)aminomethane hydrochloride.

38. A method as set forth in claim 26 wherein said phase change material comprises a mixture of hexamethylenediamine and water.

39. A method as set forth in claim 26 wherein said phase change material comprises a mixture of hexamethylenediamine and hexamethyleneimine.

40. A composition adapted for use in active or passive thermal energy storage system comprising a phase change material and a nucleating agent therefor, said phase change material being selected from the group consisting of aliphatic diamines having the general formula

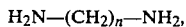

$$H_2N-(CH_2)_n-NH_2,$$

where n is an integer between 4 and 14 inclusive, bis(hexamethylene)triamine, 3-aminobutylcyclohexylamine, p-phenylenediamine, mixtures of said amines with each other, mixtures containing at least one of said amines and water and mixtures containing at least one of said amines and an agent for lowering the melting point thereof.

41. A composition as set forth in claim 40 wherein said nucleating agent is selected from the group consisting of cysteine hydrochloride and tris(hydroxymethyl)aminomethane hydrochloride.

* * * * *